H. GIBBS.
CAP FOR WATER PIPES.
APPLICATION FILED JAN. 13, 1915.
1,134,605.
Patented Apr. 6, 1915.
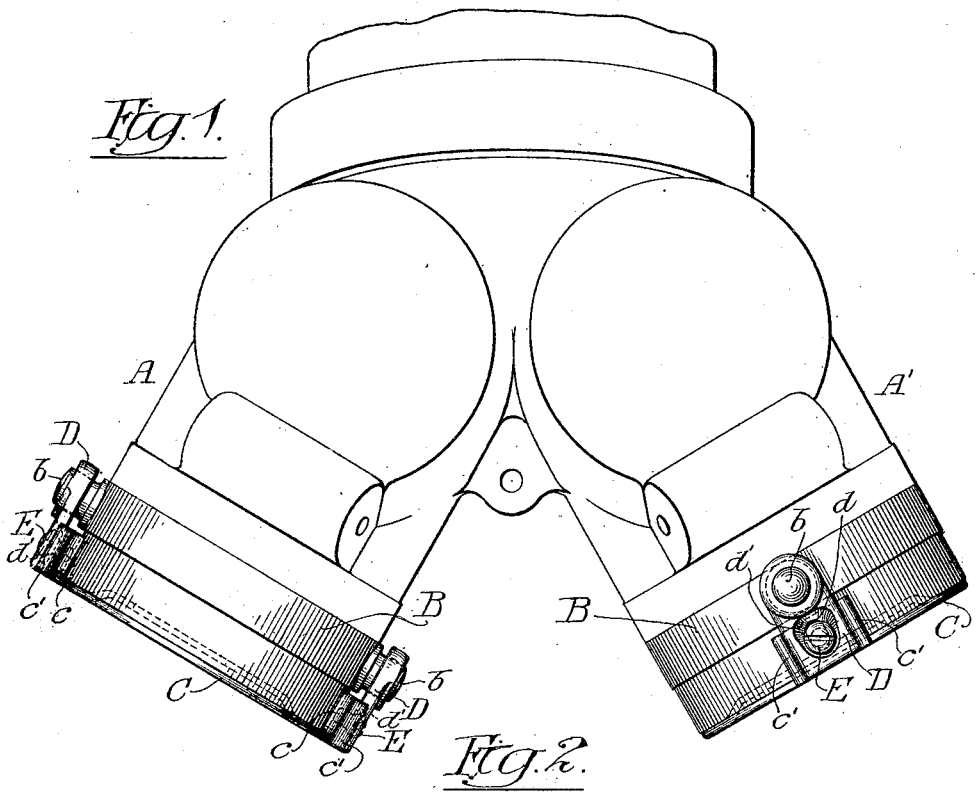
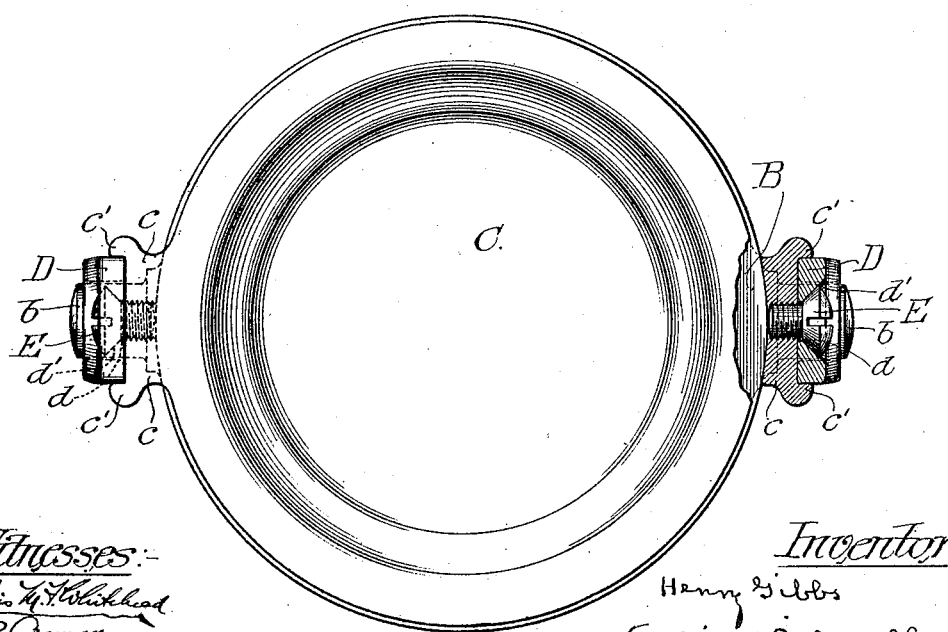
Witnesses:—
Inventor:
Henry Gibbs

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

CAP FOR WATER-PIPES.

1,134,605.

Specification of Letters Patent.

Patented Apr. 6, 1915.

Application filed January 13, 1915. Serial No. 2,049.

*To all whom it may concern:*

Be it known that I, HENRY GIBBS, a citizen of the United States, and residing at Chicago, county of Cook, and State of Illinois, have invented certain new and useful Improvements in Caps for Water-Pipes, of which I declare the following to be a full, clear, and exact description, reference being had to the accompanying drawing, forming a part of this specification.

My present invention has for its object to provide an improved cap adapted to temporarily close the open ends of water pipes such as are used for fire hose, and the invention consists in the features of novelty hereinafter described, illustrated in the accompanying drawing and particularly pointed out in claims at the end of this specification.

Figure 1 is a plan view of the end portion of a twin or Siamese stand-pipe having my invention applied thereto. Fig. 2 is an end view upon an enlarged scale, of one of the twin pipes shown in Fig. 1, with my improved cap thereon.

A and A' denote the twin end members of the stand-pipe, each of which as shown is provided with a swivel coupling ring B of familiar construction. As the parts at the ends of the two sections A and A' are the same, a description of one will answer for both. Each of the swivel coupling rings B is provided with the usual laterally extending lugs $b$ to receive a spanner when a hose is to be attached to the coupling ring, it being understood, of course, that the interior of each of the coupling rings B is screwthreaded to receive the end of the hose coupling. Over the open end of the pipe, and over the end of such coupling ring B, is placed my improved cap. This cap comprises a plate C, preferably of thin cast metal, and from this plate project the inwardly extending arms whereby the plate will be connected to the studs $b$ of the coupling ring B. As shown, each plate C is formed at diametrically opposite points with lugs $c$, and upon the outer face of each with lugs $c$ are formed the raised ribs $c'$ between lugs $c$ which will be placed the inwardly extending arms D whereby the cap plate C is held in place over the end of the pipe, the inner end of each of the arms D being provided with a hole to receive the corresponding stud $b$ of the coupling ring B. One at least, and preferably both, of the arms D, is detachably connected to the plate C, and the connection between the arms D and the plate C is preferably such that the plates can be adjusted as they are placed in position to compensate for slight variations in the length of the coupling rings B. As shown, each of the arms D is formed with an oblong slot $d$ (see Fig. 1) having an inclined wall $d'$, and through this slot $d$ passes a screw E that enters a threaded hole formed in the inwardly projecting portion of the corresponding lug $c$. The head of each of the screws E is beveled as shown in Fig. 2, to coöperate with the beveled wall of the slot $d$ through which the screw passes.

In applying my improved cap, the arms D will be set over the studs $d$ of the coupling ring B, and the lugs $c$ of the plate will be slipped between the outer ends of the arms, the arms setting between the ribs $c'$. The screws E will then be passed through the slots $d$ of the arms D into the threaded holes of the lugs $c$. As the screws E are tightened, the beveled inner surface of the screw heads will ride against the inclined wall of the slot $d$, and as the screws are within the threaded holes of the lugs $c$, the tightening of the screw heads against the inclined walls of the slot $d$ will cause the cap plate C to be driven inward, so as to closely fit over the outer end of the coupling ring B. Hence it will be seen that if the cap plate be used upon a coupling ring of a size somewhat shorter than the size for which the cap plate was specially designed, the tightening of the screws E will nevertheless insure the snug engagement of the cap plate against the end of the ring.

Preferably the cap plate C is formed with its central portion depressed, as shown by dotted lines in Fig. 1, this depressed portion of the cap plate slightly entering the end of the coupling ring, thus tending to more firmly hold the cap plate upon the ring.

When it is desired to couple the hose to the stand-pipe, the fireman may with his ax or with the end of the hose coupling, break off the cap plate C, or if there is no great haste in the attachment of the hose, he can detach the cap plate by removing the screws E. With this class of cap plate, however, it is desirable that the construction shall be very cheap, as in the haste of attaching the hose incident to a fire, the fireman usually breaks off the protecting cap instead of delaying to otherwise remove it.

Having thus described my invention, what I claim as new and desire to secure by Letters Patent, is:—

1. A cap for water pipes comprising a plate adapted to set over the end of the pipe, and arms extending inwardly from said plate and provided with holes to receive lateral projections at the end of the pipe, one at least of said arms being detachably connected to said plate.

2. A cap for water pipes comprising a plate adapted to set over the pipe, lugs on said plate provided with ribs and inwardly projecting arms detachably connected to said lugs.

3. A cap for water pipes comprising a plate adapted to set over the end of the pipe, lugs on said plate and slotted arms projecting inwardly from said lugs, and screws connecting said arms and lugs.

4. A cap for water pipes comprising a plate adapted to set over the end of the pipe, lugs on said plate provided with threaded holes, inwardly projecting slotted arms, and screws passing through the slots of said arms and into the threaded holes of said lugs, the walls of the slots of said arms being inclined.

5. A cap for water pipes comprising a plate having an inwardly depressed central portion and adapted to set over the end of the pipe, and arms extending inwardly from said plate and provided with holes to receive lateral projections at the end of the pipe, one at least of said arms being detachably connected to said plate.

HENRY GIBBS.

Witnesses:
J. G. ANDERSON,
A. R. CROSMAN.

Copies of this patent may be obtained for five cents each, by addressing the "Commissioner of Patents, Washington, D. C."